US009751788B2

(12) United States Patent
Hernandez-Mena et al.

(10) Patent No.: US 9,751,788 B2
(45) Date of Patent: Sep. 5, 2017

(54) BACTERIAL ADDITIVES FOR BIOLOGICAL AND/OR CHEMICAL CONTAMINANTS WITHIN WATER-BASED FLUIDS

(71) Applicant: BAKER HUGHES INCORPORATED, Houston, TX (US)

(72) Inventors: Roy Hernandez-Mena, The Woodlands, TX (US); Simon Cornelius, Tomball, TX (US); James Kiolbassa, Mansfield, TX (US)

(73) Assignee: Baker Hughes Incorporated, Houston, TX (US)

( * ) Notice: Subject to any disclaimer, the term of this patent is extended or adjusted under 35 U.S.C. 154(b) by 197 days.

(21) Appl. No.: 14/336,858

(22) Filed: Jul. 21, 2014

(65) Prior Publication Data

US 2015/0315052 A1 Nov. 5, 2015

Related U.S. Application Data

(63) Continuation-in-part of application No. 14/268,554, filed on May 2, 2014, now Pat. No. 9,399,591.

(51) Int. Cl.
*C02F 3/12* (2006.01)
*C02F 3/34* (2006.01)
*C02F 101/34* (2006.01)

(52) U.S. Cl.
CPC .............. *C02F 3/34* (2013.01); *C02F 3/1236* (2013.01); *C02F 2101/34* (2013.01); *Y02W 10/15* (2015.05)

(58) Field of Classification Search
CPC ....... C02F 3/34; C02F 3/1236; C02F 2101/34
USPC ....... 210/601, 612, 613, 620, 621, 622, 623, 210/908, 909
See application file for complete search history.

(56) References Cited

U.S. PATENT DOCUMENTS

| 3,867,284 | A | | 2/1975 | Kappe et al. | |
|---|---|---|---|---|---|
| 5,679,568 | A | * | 10/1997 | Imamura | A62D 3/02 210/600 |
| RE37,181 | E | | 5/2001 | Hunniford et al. | |
| 6,383,379 | B1 | * | 5/2002 | Choi | C02F 3/12 210/195.3 |
| 7,799,215 | B2 | | 9/2010 | Matheis et al. | |
| 2003/0190742 | A1 | * | 10/2003 | Whiteman | C02F 3/12 435/262 |
| 2004/0180424 | A1 | * | 9/2004 | Christiansen | C02F 3/345 435/266 |

(Continued)

FOREIGN PATENT DOCUMENTS

WO 0144119 A1 6/2001

*Primary Examiner* — Fred Prince
(74) *Attorney, Agent, or Firm* — Mossman, Kumar & Tyler, P.C.

(57) ABSTRACT

An effective amount of at least one second bacteria may be added to a wastewater stream within a water treatment system. The wastewater stream may have or include an aqueous-based fluid, a first bacteria and organic acids. The second bacteria may be or include, but is not limited to facultative bacteria, spore-forming bacteria, phenol degrading bacteria, denitrifying bacteria, organic acid-degrading bacteria, high temperature bacteria, and combinations thereof. The addition of the second bacteria the wastewater treatment system may at least partially reduce the amount of the organic acids within the wastewater stream as compared to an otherwise identical wastewater stream in the absence of the second bacteria.

18 Claims, 1 Drawing Sheet

(56) References Cited

U.S. PATENT DOCUMENTS

2007/0158264 A1* 7/2007 Zhang .................. C02F 3/286
  210/603
2011/0253625 A1 10/2011 Takeda
2012/0024780 A1 2/2012 Carr et al.
2013/0337518 A1* 12/2013 Razavi-Shirazi ....... C02F 3/348
  435/140

* cited by examiner

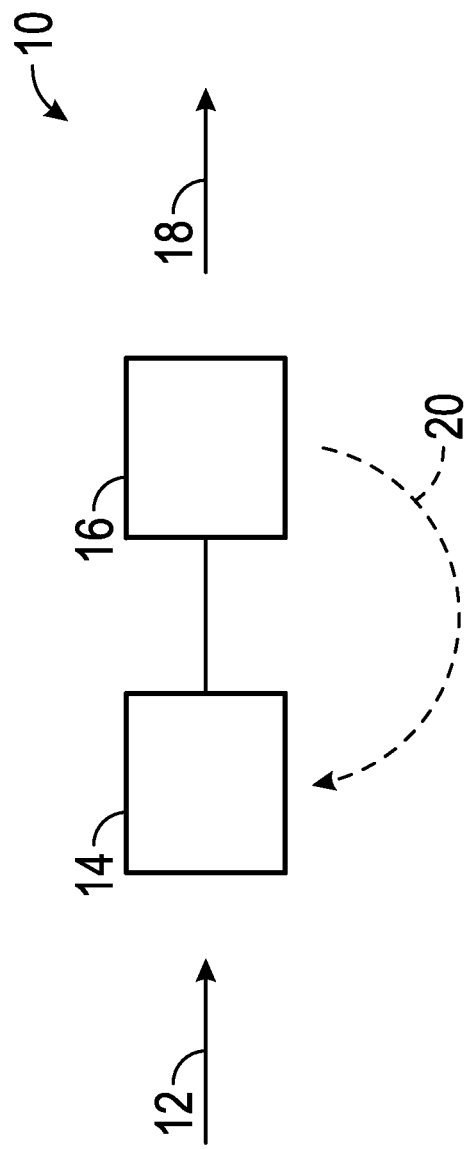

BACTERIAL ADDITIVES FOR BIOLOGICAL AND/OR CHEMICAL CONTAMINANTS WITHIN WATER-BASED FLUIDS

CROSS REFERENCE TO RELATED APPLICATION

This application is a Continuation-in-Part and claims priority to U.S. application Ser. No. 14/268,554 filed on May 2, 2014.

TECHNICAL FIELD

The present invention relates to methods and water treatment systems for at least partially reducing an amount of organic acids and/or first bacteria within a water-based fluid by adding an effective amount of at least one second bacteria to the water-based fluid.

BACKGROUND

Organic acids may be added to hydrocarbon fluids, such as heavy oil, Canadian crudes, shale oil, and the like to remove metals, amines, and eliminate emulsions therefrom. The organic acids added thereto may promote excessive filamentous bacterial growth and/or increase levels of slime-forming bacteria, e.g. Zoogloea within a wastewater stream produced from the hydrocarbon fluid. This bacterial growth may reduce sludge settling in clarifiers and cause operational problems within a wastewater system.

Effective handling of wastewater is an extremely important aspect of increasing the quality of life and conservation of clean water. The problems associated with simply discharging wastewater into water sources, such as rivers, lakes, and oceans are apparent—the biological and chemical wastes may create hazards to life forms including the potential spread of infectious diseases and exposure to carcinogenic chemicals. Therefore, wastewater treatment processes have evolved into systems ranging from the ubiquitous municipal wastewater treatment facilities, where sanitary wastewater from domestic populations is cleaned, to specialized industrial wastewater treatment processes, where specific pollutants in wastewater from various industrial applications must be addressed.

Biological and chemical compounds in certain wastewater streams may need to be reduced to a particular amount or removed altogether. Various attempts have been made to address treatment of such compounds. Therefore, it would be beneficial to discover new methods to treat wastewater and further reduce the amount of undesirable biological and/or chemical contaminants within the wastewater stream.

SUMMARY

There is provided, in one form, a method for at least partially decreasing an amount of organic acids present in a water-based fluid. The method may include adding an effective amount of at least one second bacteria to the water-based fluid comprising organic acids to at least partially consume the organic acids. The second bacteria may be or include, but is not limited to facultative bacteria, spore-forming bacteria, phenol degrading bacteria, denitrifying bacteria, organic acid-degrading bacteria, high temperature bacteria, and combinations thereof. The organic acids may be or include, but are not limited to glycolic acid, malic acid, acetic acid, lactic acid, butyric acid, propionic acid, succinic acid, fumaric acid, benzoic acid, and combinations thereof.

In an alternative non-limiting embodiment of the method, the method may include adding an effective amount of at least one second bacteria to a water-based fluid comprising organic acids and at least one first bacteria, and decreasing the amount of the first bacteria in the water-based fluid as compared to an otherwise identical water-based fluid absent the second bacteria. The second bacteria may out-compete the first bacteria for the organic acids present within the water-based fluid. The organic acids may be or include, but are not limited to, glycolic acid, malic acid, acetic acid, lactic acid, butyric acid, propionic acid, succinic acid, fumaric acid, benzoic acid, and combinations thereof. The first bacteria may be or include, but are not limited to filamentous bacteria, Zooglea bacteria, and combinations thereof.

There is provided, in another non-limiting embodiment, a water treatment system having a wastewater stream flowing therethrough. The water treatment system may include an influent wastewater stream flowing into the water treatment system having at least one organic acid, at least one second bacterial additive zone, and an effluent wastewater stream flowing out of the water treatment system. The second bacterial additive zone may include the influent wastewater stream and an effective amount of at least one second bacteria to consume the organic acid(s). The second bacterial additive zone may be or include an equalization tank, an aeration basin, a return activated sludge (RAS) line, and combinations thereof. The second bacteria may be or include, but is not limited to, facultative bacteria, spore-forming bacteria, phenol degrading bacteria, denitrifying bacteria, organic acid-degrading bacteria, high temperature bacteria, and combinations thereof. The effluent wastewater stream may include a reduced amount of the at least one organic acid as compared to an otherwise identical effluent wastewater stream absent the second bacteria.

In an alternative non-limiting embodiment of the water treatment system, the water treatment system may have at least one first bacteria that may be or include, but is not limited to filamentous bacteria, Zooglea bacteria, and combinations thereof. The effluent wastewater stream may have or include a reduced amount of the first bacteria as compared to an otherwise identical effluent wastewater stream absent the second bacteria.

The second bacteria may consume the organic acid(s) in the presence of the nitrogen-containing compounds, which decreases the amount of organic acids available for consumption by a first bacteria, and thereby reduces the amount of the first bacteria present in the water-based fluid.

BRIEF DESCRIPTION OF THE DRAWING

FIG. 1 is a diagram of one embodiment of a water treatment system having an equalization tank, an aeration basin, and a return activated sludge (RAS) line.

It will be appreciated that the system illustrated in the FIGURE is simply a non-restrictive embodiment of a water treatment system as described herein; the features of which are not necessarily to scale, and which may be reconfigured in design, orientation and appearance, while still being encompassed by the methods and systems described and claimed herein.

DETAILED DESCRIPTION

It has been discovered that the presence or amount of organic acids within water-based fluids may be decreased or eliminated by adding at least one second bacteria to the water-based fluid in an effective amount to at least partially consume the organic acids and thereby decrease the amount of organic acids in the water-based fluid as compared to an otherwise identical water-based fluid absent the second bacteria. The second bacteria may be or include, but are not limited to, facultative bacteria, spore-forming bacteria, phenol degrading bacteria, denitrifying bacteria, organic acid-degrading bacteria, high temperature bacteria, and combinations thereof. A non-limiting example of the second bacteria may be the bacterial additive known as CHEMCROBE 751™, which is distributed by Baker Hughes Incorporated. CHEMCROBE 751™ is a bacteria-in-liquid concentrate that is a liquid blend of the nitrifying strains *Nitrosomonas* and *Nitrobacter* bacteria.

Facultative bacteria may aerobically metabolize dissolved oxygen if present in the wastewater stream. However, the facultative bacteria may switch to an anaerobic metabolism or an anoxic metabolism in the absence of dissolved oxygen. Non-limiting examples of the facultative bacteria for consuming the organic acids and/or out-competing the first bacteria may be or include, but is not limited to *Thiobacillus denitrificans, Micrococcus denitrificans, Paracoccus Alcagenes, Flavobacterium* and *Pseudomonas*, other facultative bacteria capable of consuming organic acids under anaerobic or anoxic conditions that may or may not also denitrify, and combinations thereof.

Spore-forming bacteria may form a spore, which is a stripped-down, dormant form of the bacteria that the bacteria may reduce itself into. Spore formation is usually triggered by a lack of nutrients available to the bacteria, and the spore enables the bacteria to lie dormant for extended periods of time. When the environment becomes more favorable, the spore may reactivate itself into its vegetative state. Most types of bacteria cannot change to the endospore form. Non-limiting examples of spore-forming bacteria may be or include *Bacillus, Clostridium*, and combinations thereof.

The phenol-degrading bacteria typically degrade phenols but may degrade nitrogen in the absence of phenol. Non-limiting examples of the phenol-degrading bacteria may be or include, but is not limited to *Azoarcus, Thauera, Streptococcus epidermis, Rhodococcus rhodochrous, Pseudomonas putida*, other phenol-degrading bacteria, and combinations thereof.

The denitrifying bacteria may metabolize nitrogenous compounds, such as those bacteria having a nitrate reductase enzyme in a non-limiting instance, where oxides may be turned back into nitrogen gas and/or nitrous oxides. Non-limiting examples of denitrifying bacteria may be or include, but is not limited to, *Paracoccus denitrificans, Pseudomonas stutzeri*, and combinations thereof.

The organic acid-degrading bacteria may degrade or otherwise inactivate an organic acid, such as glycolic acid, malic acid, acetic acid, lactic acid, butyric acid, propionic acid, and combinations thereof in a non-limiting example. The organic acid-degrading bacteria may use glycolic acid for energy and/or to produce carbon dioxide in a non-limiting embodiment. The organic acid-degrading bacteria may use acetic acid for growth, and the acetic acid may aid in formation of the bacteria cells in another non-limiting embodiment. The organic acid-degrading bacteria may be or include, but is not limited to *Paracoccus denitrificans, Pseudomonas stutzeri*, and combinations thereof.

The high temperature bacteria may exist at high temperatures ranging from about 25 C independently to about 46 C, or from about 35 C independently to about 43 C. Non-limiting examples of the high temperature bacteria may be or include bacteria that may grow at such high temperatures, which may be or include any of the bacteria mentioned herein.

The aqueous-based fluid may be or include a wastewater stream, such as but not limited to, desalter wash water, overhead water from atmospheric or vacuum process units, strip sour water, coker water blowdown, cooling water blowdown, boiler water blowdown, oily water sewers, equalization tank water, cleaning solutions used for scale removal, water bottoms from storage tanks, API unit water, dissolved gas flotation unit water, and combinations thereof.

An API unit is a wastewater processing unit that allows for the separation of free oil from the wastewater. The API unit may allow any solids present to settle to the bottom of the fluid. After the separation of the oil and/or the solids, the water may be fed into other units as the water eventually makes its way to the aeration basin.

Organic acids may be present in a wastewater stream because the organic acids are added to crude oil to improve the removal of contaminants from the crude oil when processing the crude oil at a refinery, such as during a desalting process of the crude oil. The organic acids may be or include, but are not limited to, glycolic acid, malic acid, acetic acid, lactic acid, butyric acid, propionic acid, succinic acid, fumaric acid, benzoic acid, other water-soluble organic acids, alcohols, and combinations thereof.

The origin of organic acids may also include their presence in certain type of crudes. These crudes include, but are not limited to, heavy Canadian crudes, Venezuelan crudes, and shale oils. Organic acids may also be generated by anaerobic activity found in sewer systems and holding tanks within an industrial setting. However, organic acids present in the wastewater stream may increase the growth of a first bacteria that utilize the organic acids. The overgrowth of the first bacteria may result in poor settling conditions in the water treatment system.

The first bacteria may be or include, but is not limited to, filamentous bacteria, Zoogloea bacteria, and combinations thereof. Non-limiting examples of the filamentous bacteria may be or include, but are not limited to *Nostocoida limicola, Thiothrix*, type 021N, type 0581, type 0411, other organisms, and combinations thereof. The type 021N, type 0581, type 0411 bacteria are filamentous bacteria that have been observed in wastewater systems but may not be grown outside of the wastewater treatment system. Such designations were devised by Dick Eikelboom, known by those skilled in the art of waste-water treatment systems. 'Other organisms' is defined herein to be any organism that has a selective advantage to proliferate when organic acids are present in a waste treatment system; such 'other organisms' may cause issues in the waste treatment system if they happen to over-proliferate. Non-limiting examples of the Zoogloea bacteria may be or include, but are not limited to amorphous Zoogloea, fingered Zoogloea, and combinations thereof. 'First bacteria' are defined herein as the bacteria that are targeted to be out-competed by the second bacteria; 'second bacteria' are defined herein as the bacteria that may out-compete the first bacteria for similar nutrients.

The second bacteria may be added to the water-based fluid in the absence of the first bacteria. Said differently, the 'first' and 'second' designation with regards to the bacteria are simply to distinguish the bacteria from each other; such designation is not used to imply a chronological order where the bacteria is added to the water.

The second bacteria may convert nitrate ($—NO_3$), nitrite ($—NO_2$), and/or a denitrification intermediate, and combinations thereof and consume the organic acids in the process in one non-limiting embodiment. A denitrification intermediate is defined herein as any intermediate associated with the denitrification process. The addition of nitrogen-containing composition(s) to the wastewater stream may allow for continuous de-nitrification to occur under anoxic conditions for consumption of the organic acids by the second bacteria. However, the second bacteria may consume the organic acids and optionally out-compete the first bacteria in the absence of nitrogen-containing components added to the water-based fluid. Ultimately, decreasing the amount of the organic acids available for the growth of the first bacteria may reduce the amount of the first bacteria.

'Out-compete' is defined herein as the ability of the second bacteria to consume the organic acids at a faster rate than the first bacteria. The result may be a decline or elimination of the first bacteria population. While elimination of the first bacteria population is a worthwhile and acceptable goal, it will be appreciated that the methods described herein may be considered successful if a decline in the first bacteria population is achieved. The water-based fluid composition may have or include, but is not limited to, a water-based fluid, a second bacteria, at least one organic acid, an optional first bacteria, and combinations thereof.

In a non-limiting embodiment, the second bacteria may be added to the wastewater stream or water-based fluid at a rate ranging from about 20 to about 100 pounds (lbs)/day per million gallons of wastewater stream for the first 3 days of operation. During days 4-7 of treating the wastewater stream, the amount of the second bacteria may be added to the wastewater stream at the same rate or at a reduced rate, such as from about 5 to about 40 lbs/day per million gallons of bioreactor flow.

Since there are many variables, the dose rate should be used as a guide only. Factors that affect dose rates may include, but are not limited to, the concentration of organic acids in the water-based fluid or influent stream, the amount of second bacteria present to consume the organic acids, pH, temperature, toxicity of influent wastewater, wastewater treatment goals, substrates (e.g. bacteria) to be treated, and desired effluent wastewater quality. Biological wastewater treatment plants may require substantially more bacteria than put forth here and many may use much less.

In a non-limiting embodiment, an additional component may be added to the wastewater stream at the same time or different time as the second bacteria. The additional component may be or include, but is not limited to, microorganisms, macroorganisms, micronutrients, macronutrients, trace elements, vitamins, and combinations thereof. Macronutrients may be or include, but are not limited to phosphorus (e.g. ortho $PO_4$), ammonia, other phosphorus containing compounds, amines or ammonia containing compounds, and the like. The amount of macronutrients within the wastewater may range from about 0.5 ppm independently to about 5 ppm, or from about 1 ppm independently to about 3 ppm.

The second bacteria may be added to the water-based fluid at a second bacterial additive zone, which is a location within the water treatment system, such as but not limited to, an aeration basin, an equalization tank, a RAS line, and combinations thereof.

Turning to the FIGURE, FIG. 1 is a diagram of one embodiment of the water treatment system 10. The influent wastewater 12 flows into the water treatment system and into an equalization tank 14 upstream from the aeration basin 16. The second bacteria may be added to the equalization tank 14. The second bacteria may at least partially consume any organic acids present in the water-based fluid. Alternatively, the second bacteria may out-compete any first bacteria present in the water-based fluid for the organic acids. This may lead to lower levels of the organic acids and first bacteria and better wastewater system performance. Over time, the first bacteria may be starved out and may be replaced by the second bacteria. The wastewater stream may flow from the equalization tank 14 to the aeration basin 16 and eventually out of the water treatment system as effluent wastewater 18. The effluent wastewater 18 may have a reduced amount of the organic acids and first bacteria as compared to an otherwise identical effluent wastewater 18 absent the second bacteria.

In a non-limiting instance, the wastewater may be flowed back to the equalization tank 14 from the aeration basin 16 via a return activated sludge line (RAS) line 20 depending on the levels of the organic acids and/or first bacteria present in the wastewater. In an alternative non-limiting embodiment, the second bacteria may be added to the RAS line 20 in addition to or alternative to the equalization tank 14.

In the foregoing specification, the invention has been described with reference to specific embodiments thereof, and has been described as effective in providing methods and water treatment systems for at least partially decreasing an amount of organic acids and/or first bacteria within the wastewater stream as compared to an otherwise identical wastewater stream absent the second bacteria. However, it will be evident that various modifications and changes can be made thereto without departing from the broader spirit or scope of the invention as set forth in the appended claims. Accordingly, the specification is to be regarded in an illustrative rather than a restrictive sense. For example, specific first bacteria, second bacteria, second bacterial additive zones, macronutrients, micronutrients, and organic acids falling within the claimed parameters, but not specifically identified or tried in a particular composition or method, are expected to be within the scope of this invention.

The present invention may suitably comprise, consist or consist essentially of the elements disclosed and may be practiced in the absence of an element not disclosed. For instance, the method for at least partially decreasing an amount of organic acids present in a water-based fluid may consist of or consist essentially of adding an effective amount of at least one second bacteria to the water-based fluid comprising organic acids to at least partially consume the organic acids; the second bacteria may be or include, but is not limited to facultative bacteria, spore-forming bacteria, phenol degrading bacteria, denitrifying bacteria, organic acid-degrading bacteria, high temperature bacteria, and combinations thereof; the organic acids may be or include, but are not limited to glycolic acid, malic acid, acetic acid, lactic acid, butyric acid, propionic acid, succinic acid, fumaric acid, benzoic acid, and combinations thereof.

The water treatment system having a wastewater stream flowing therethrough may consist of or consist essentially of an influent wastewater stream flowing into the water treatment system having at least one organic acid, at least one second bacterial additive zone, and an effluent wastewater stream flowing out of the water treatment system; the second bacterial additive zone may include the influent wastewater stream and an effective amount of at least one second bacteria to consume the organic acid(s); the second bacterial additive zone may be or include an equalization tank, an aeration basin, a return activated sludge (RAS) line, and combinations thereof; the second bacteria may be or include, but is not limited to, facultative bacteria, spore-forming bacteria, phenol degrading bacteria, denitrifying bacteria, organic acid-degrading bacteria, high temperature bacteria, and combinations thereof; the effluent wastewater stream may include a reduced amount of the at least one organic acid as compared to an otherwise identical effluent wastewater stream absent the second bacteria.

What is claimed is:

1. A method for at least partially decreasing an amount of organic acids present in a water-based fluid, wherein the method comprises:
adding an effective amount of at least one second bacteria to the water-based fluid comprising organic acids to at least partially consume the organic acids; wherein the at least one second bacteria is selected from the group consisting of:
facultative bacteria selected from the group consisting of *Thiobacillus denitrificans, Micrococcus denitrificans, Paracoccus Alcagenes*, and *Flavobacterium*,
spore-forming bacteria selected from the group consisting of *Bacillus*, and *Clostridium*,
phenol degrading bacteria selected from the group consisting of *Azoarcus, Thauera, Streptococcus epidermis, Rhodococcus rhodochrous,*
*Paracoccus denitrificans* denitrifying bacteria,
*Paracoccus denitrificans* organic acid-degrading bacteria,
and
combinations thereof;
wherein the water-based fluid further comprises at least one first bacteria selected from the group consisting of filamentous bacteria, Zooglea bacteria, and combinations thereof, and wherein the organic acids are selected from the group consisting of glycolic acid, malic acid, acetic acid, lactic acid, butyric acid, propionic acid, succinic acid, fumaric acid, benzoic acid, and combinations thereof.

2. The method of claim 1, further comprising decreasing the amount of organic acids in the water-based fluid as compared to an otherwise identical water-based fluid absent the at least one second bacteria.

3. The method of claim 1, further comprising decreasing an amount of the at least one first bacteria present in the water-based fluid.

4. The method of claim 1, wherein the at least one second bacteria out-competes the at least one first bacteria for the organic acids.

5. The method of claim 1, wherein the water-based fluid is a wastewater stream within a water treatment system.

6. The method of claim 5, wherein the at least one second bacteria is added to the water-based fluid at a location within the water treatment system selected from the group consisting of an aeration basin, an equalization tank, a RAS line, and combinations thereof.

7. The method of claim 6, wherein the wastewater stream is selected from the group consisting of desalter wash water, overhead water from atmospheric or vacuum process units, strip sour water, coker water blowdown, cooling water blowdown, boiler water blowdown, oily water sewers, equalization tank water, cleaning solutions used for scale removal, water bottoms from storage tanks, API unit water, dissolved gas flotation unit water, and combinations thereof.

8. The method of claim 6, further comprising decreasing bulking issues downstream from the aeration basin.

9. The method of claim 1, wherein the adding the at least one second bacteria occurs at a rate selected from the group consisting of continually, intermittently at consistent intervals, intermittently at inconsistent intervals, and combinations thereof.

10. The method of claim 9, wherein the effective amount of the at least one second bacteria ranges from about 5 pounds/day to about 100 pounds/day per one million gallons of the water-based fluid.

11. A method comprising:
adding an effective amount of at least one second bacteria to a water-based fluid comprising organic acids and at least one first bacteria; wherein the at least one second bacteria out-competes the at least one first bacteria for the organic acids present within the water-based fluid; wherein the organic acids are selected from the group consisting of glycolic acid, malic acid, acetic acid, lactic acid, butyric acid, propionic acid, succinic acid, fumaric acid, benzoic acid, and combinations thereof; wherein the at least one first bacteria is selected from the group consisting of filamentous bacteria, Zooglea bacteria, and combinations thereof, wherein the at least one second bacteria is selected from the group consisting of:
facultative bacteria selected from the group consisting of *Thiobacillus denitrificans, Micrococcus denitrificans, Paracoccus Alcagenes*, and *Flavobacterium*,
spore-forming bacteria selected from the group consisting of *Bacillus*, and *Clostridium*,
phenol degrading bacteria selected from the group consisting of *Azoarcus, Thauera, Streptococcus epidermis, Rhodococcus rhodochrous*,
*Paracoccus denitrificans* denitrifying bacteria,
*Paracoccus denitrificans* organic acid-degrading bacteria, and
combinations thereof; and
decreasing the amount of the at least one first bacteria in the water-based fluid as compared to an otherwise identical water-based fluid absent the at least one second bacteria.

12. The method of claim 11, wherein the effective amount of the at least one second bacteria ranges from about 5 pounds/day to about 100pounds/day per one million gallons of the water-based fluid.

13. A water treatment system having a wastewater stream flowing therethrough, the water treatment system comprising:
an influent wastewater stream flowing into the water treatment system having at least one organic acid;
at least one second bacterial additive zone comprising the influent wastewater stream and an effective amount of at least one second bacteria to consume the at least one organic acid; wherein the at least one second bacteria is selected from the group consisting of:
facultative bacteria selected from the group consisting of *Thiobacillus denitrificans, Micrococcus denitrificans, Paracoccus Alcagenes*, and *Flavobacterium*,
spore-forming bacteria selected from the group consisting of *Bacillus*, and *Clostridium*,
phenol degrading bacteria selected from the group consisting of *Azoarcus, Thauera, Streptococcus epidermis, rhodochrous*,
*Paracoccus denitrificans* denitrifying bacteria,
*Paracoccus denitrificans* organic acid-degrading bacteria, and
combinations thereof;
and wherein the second bacterial additive zone is selected from the group consisting of an equalization tank, an aeration basin, a return activated sludge (RAS) line, and combinations thereof;
an effluent wastewater stream flowing out of the water treatment system; and wherein the effluent wastewater stream comprises a reduced amount of the at least one organic acid as compared to an otherwise identical effluent wastewater stream absent the at least one second bacteria.

14. The water treatment system of claim 13, wherein the at least one organic acid is selected from the group consisting of glycolic acid, malic acid, acetic acid, lactic acid, butyric acid, propionic acid, succinic acid, fumaric acid, benzoic acid, and combinations thereof.

15. The water treatment system of claim 13, wherein the water-based fluid further comprises at least one first bacteria selected from the group consisting of filamentous bacteria, Zooglea bacteria, and combinations thereof; and wherein a decreased amount of the at least one first bacteria is present in the fluid composition as compared to an otherwise identical fluid composition absent the at least one second bacteria.

16. The water treatment system of claim 13, wherein the amount of the at least one second bacteria within the at least one second bacterial zone ranges from about 5 pounds/day to about 100 pounds/day per one million gallons of the influent wastewater stream.

17. The water treatment system of claim 13, wherein the influent wastewater stream is selected from the group consisting of desalter wash water, overhead water from atmospheric or vacuum process units, strip sour water, coker water blowdown, cooling water blowdown, boiler water blowdown, oily water sewers, equalization tank water, cleaning solutions used for scale removal, water bottoms from storage tanks, API unit water, dissolved gas flotation unit water, and combinations thereof.

18. A water treatment system having a wastewater stream flowing therethrough, the water treatment system comprising:
an influent wastewater stream flowing into the water treatment system having at least one organic acid;
at least one second bacterial additive zone comprising the influent wastewater stream, at least one first bacteria, and an effective amount of at least one second bacteria to consume the at least one organic acid; wherein the at least one second bacteria is selected from the group consisting of:
facultative bacteria selected from the group consisting of *Thiobacillus denitrificans, Micrococcus denitrificans, Paracoccus Alcagenes*, and *Flavobacterium*,
spore-forming bacteria selected from the group consisting of *Bacillus*, and *Clostridium*,
phenol degrading bacteria selected from the group consisting of *Azoarcus, Thauera, Streptococcus epidermis, Rhodococcus rhodochrous,*
*Paracoccus denitrificans* denitrifying bacteria,
*Paracoccus denitrificans* organic acid-degrading bacteria, and
combinations thereof;
and wherein the at least one first bacteria is selected from the group consisting of filamentous bacteria, Zooglea bacteria, and combinations thereof;
an effluent wastewater stream flowing out of the water treatment system; and
wherein the effluent wastewater stream comprises a reduced amount of the at least one first bacteria as compared to an otherwise identical effluent wastewater stream absent the at least one second bacteria.

\* \* \* \* \*